US012742043B2

(12) United States Patent
Choi et al.

(10) Patent No.: US 12,742,043 B2
(45) Date of Patent: Sep. 22, 2026

(54) METHOD FOR PREPARING POLYPHENYLENE OXIDE

(71) Applicant: LG CHEM, LTD., Seoul (KR)

(72) Inventors: Gyeongshin Choi, Daejeon (KR); Jihyun Choi, Daejeon (KR); Chunhwa Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 566 days.

(21) Appl. No.: 18/276,211

(22) PCT Filed: Jun. 30, 2022

(86) PCT No.: PCT/KR2022/009454
§ 371 (c)(1),
(2) Date: Aug. 7, 2023

(87) PCT Pub. No.: WO2023/277624
PCT Pub. Date: Jan. 5, 2023

(65) Prior Publication Data

US 2024/0117116 A1 Apr. 11, 2024

(30) Foreign Application Priority Data

Jul. 2, 2021 (KR) ........................ 10-2021-0087374
Jul. 2, 2021 (KR) ........................ 10-2021-0087375

(51) Int. Cl.
*C08G 65/38* (2006.01)
*C08G 65/44* (2006.01)
*C08G 65/46* (2006.01)

(52) U.S. Cl.
CPC ............. *C08G 65/44* (2013.01); *C08G 65/38* (2013.01); *C08G 65/46* (2013.01)

(58) Field of Classification Search
None
See application file for complete search history.

(56) References Cited

U.S. PATENT DOCUMENTS 3,432,469 A * 3/1969 Hay ....................... C08G 65/44 525/905
3,994,982 A 11/1976 Leach
4,092,294 A 5/1978 Bennett et al.
4,537,948 A 8/1985 Bartmann et al.
4,868,276 A * 9/1989 Nagaoka ................ C08G 65/44 528/215
5,001,214 A 3/1991 White et al.
6,261,987 B1 7/2001 Watson et al.
6,291,724 B1 9/2001 Braat
6,759,507 B1 * 7/2004 Yoshida ................ C08G 65/46 528/495
2004/0236060 A1 11/2004 Mitsui et al.
2005/0070685 A1 3/2005 Mitsui et al.
2005/0228123 A1 10/2005 Sakuma et al.
2006/0160982 A1 7/2006 Shii et al.
2015/0141610 A1 5/2015 Fung et al.
2017/0275424 A1 9/2017 Yamamoto et al.

FOREIGN PATENT DOCUMENTS

CN 104403097 A 3/2015
GB 1320600 A 6/1973
JP S51-001759 B1 1/1976
JP S52-027731 A 3/1977
JP S53-030698 A 3/1978
JP 56-21007 B * 5/1981
JP 56-068631 A 6/1981
JP 57-177018 A 10/1982
JP S59-23332 B2 6/1984
JP S61-183240 A 8/1986
JP S62-041223 A 2/1987
JP H06-207002 A 7/1994
JP H10-176053 A 6/1998
JP H11-158098 A 6/1999
JP 2003-012796 A 1/2003
JP 2003-261674 A 9/2003
JP 2004-500238 A 1/2004
JP 2004-339343 A 12/2004
JP 2004339343 * 12/2004
JP 2005-023201 A 1/2005
JP 6037764 B2 5/2014
JP 2017-179009 A 10/2017
KR 10-1996-0004115 B1 3/1996
KR 10-2004-0019388 A 3/2004
KR 10-2006-0066167 A 6/2006
KR 10-2009-0020367 A 2/2009
KR 10-0964800 B1 6/2010
KR 10-1104474 B1 1/2012
KR 10-2012-0134953 A 12/2012

OTHER PUBLICATIONS

Shin et al., "Effects of Chemical Structure of Amine Ligands on the Copper-catalyzed Oxidative Polymerization of 2,6-dimethylphenol", Polymer(Korea), vol. 41, No. 4, (2017), pp. 648-655.

* cited by examiner

*Primary Examiner* — David J Buttner
(74) *Attorney, Agent, or Firm* — Bryan Cave Leighton Paisner LLP

(57) ABSTRACT

A method for preparing polyphenylene oxide, the method capable of reducing energy cost by eliminating the need for a separate process of separating and purifying ortho-cresol which is produced after an alkylation reaction of phenol, and preparing polyphenylene oxide with excellent processability in excellent yields under mild oxidative coupling reaction conditions, is provided.

15 Claims, 1 Drawing Sheet

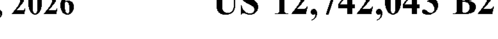
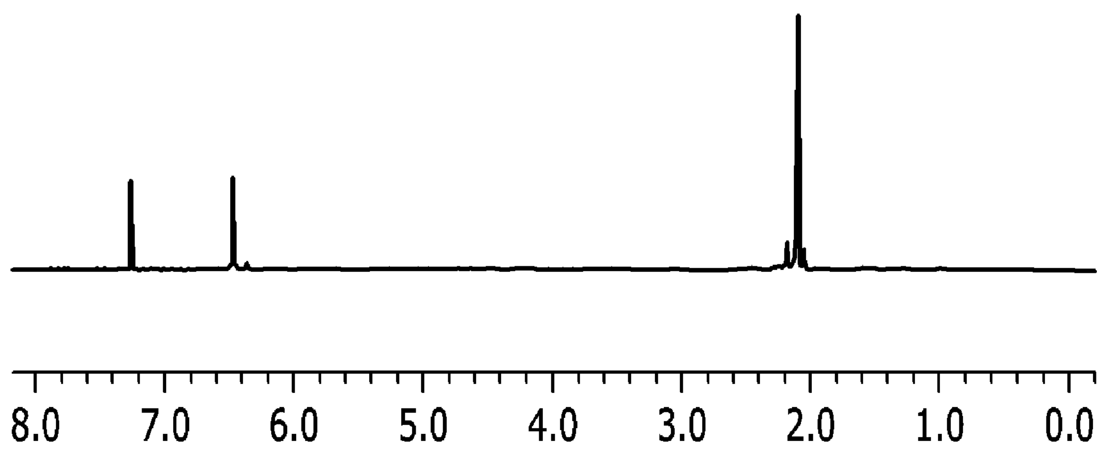
8.0
7.0
6.0
5.0
4.0
3.0
2.0
1.0
0.0

METHOD FOR PREPARING POLYPHENYLENE OXIDE

CROSS-REFERENCE TO RELATED APPLICATION

This application is a National Stage Application of International Application No. PCT/KR2022/009454 filed on Jul. 30, 2022, which claims priority to Korean Patent Application Nos. 10-2021-0087374 and 10-2021-0087375, both filed on Jul. 2, 2021, the disclosures of which are hereby incorporated by reference herein in their entirety.

FIELD

The present disclosure relates to a method for preparing polyphenylene oxide.

BACKGROUND

Polyphenylene oxide (PPO) is a type of engineering plastic that exhibits chemical resistance and high heat resistance and has excellent mechanical and electrical properties. Generally, PPO of commercial products has a number average molecular weight of 20,000 g/mol to 60,000 g/mol, and is synthesized through oxidative coupling of phenolic monomers. PPO of commercial products consists of an oligomer with a number average molecular weight of 1,300 g/mol to 2,700 g/mol and a polymer with a number average molecular weight of 17,000 g/mol to 29,000 g/mol.

Meanwhile, among the phenolic monomers used in the preparation of PPO, 2,6-xylenol is obtained through alkylation of phenol. In this case, by-products of ortho-cresol (o-cresol) and 2,4,6-trimethylphenol are also produced, in addition to 2,6-xylenol. Therefore, a process of separating and purifying the by-products is required. However, since there is a boiling point difference of about 10° C. between these by-products and 2,6-xylenol, separation and purification are difficult and costly. In particular, to separate ortho-cresol which is a major by-product, a 140-stage column is used or a method of performing azeotropic distillation with decane is used, which is a main cause of increasing the costs in the preparation of 2,6-xylenol and in the preparation of PPO using 2,6-xylenol.

Accordingly, there is a need to develop a method for preparing PPO, which is able to reduce energy costs.

SUMMARY

There is provided a method for preparing polyphenylene oxide, the method capable of reducing energy cost by eliminating the need for a separate process of separating and purifying ortho-cresol which is produced after an alkylation reaction of phenol, and also preparing polyphenylene oxide in excellent yields under mild oxidative coupling reaction conditions.

There is provided a method for preparing polyphenylene oxide, the method including preparing a mixture including 2,6-xylenol and ortho-cresol by an alkylation reaction of phenol with methanol (step 1); performing an oxidative coupling reaction of the mixture in the presence of a copper-based catalyst and an amine-based additive (step 2); and separating ortho-cresol from the reaction product resulting from the step 2 and obtaining polyphenylene oxide consisting of a repeating unit represented by the following Chemical Formula 1 (step 3), wherein the mixture includes ortho-cresol at a molar ratio of 0.2 to 0.8 with respect to 1 mole of 2,6-xylenol, and the amine-based additive includes a secondary amine, a pyridine-based compound, or a mixture thereof:

[Chemical Formula 1]

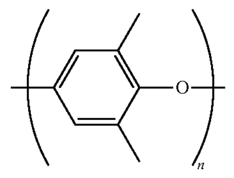

in Chemical Formula 1, n is an integer of 1 or more.

In the present disclosure, the terms "the first", "the second", and the like are used to describe a variety of components, and these terms are merely employed to differentiate a certain component from other components.

Further, the terms used in this description are just for explaining exemplary embodiments and it is not intended to restrict the present disclosure.

The singular expression may include the plural expression unless it is differently expressed contextually.

It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components or combinations thereof beforehand.

The present disclosure may be variously modified and have various forms, and specific exemplary embodiments are exemplified and explained in detail in the following description. However, it is not intended to limit the present disclosure to the specific exemplary embodiments and it must be understood that the present disclosure includes every modifications, equivalents, or replacements included in the spirit and technical scope of the present disclosure.

DETAILED DESCRIPTION

Hereinafter, the present disclosure will be described in detail.

A method for preparing polyphenylene oxide according to the present disclosure includes preparing a mixture including 2,6-xylenol and ortho-cresol by an alkylation reaction of phenol with methanol (step 1); performing an oxidative coupling reaction of the mixture in the presence of a copper-based catalyst and an amine-based additive (step 2); and separating ortho-cresol from the reaction product obtained resulting from the step 2 and obtaining polyphenylene oxide consisting of a repeating unit represented by the following Chemical Formula 1 (step 3), wherein the mixture includes ortho-cresol at a molar ratio of 0.2 to 0.8 with respect to 1 mole of 2,6-xylenol, and the amine-based additive includes a secondary amine, a pyridine-based compound, or a mixture thereof:

[Chemical Formula 1]

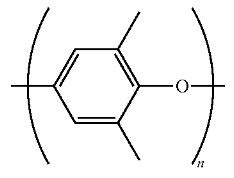

in Chemical Formula 1, n is an integer of 1 or more.

The present inventors found that when polyphenylene oxide is prepared by an oxidative coupling reaction of 2,6-xylenol, 2,6-xylenol prepared through an alkylation reaction of phenol is used in a mixture with ortho-cresol produced by a side reaction, and the content ratio of ortho-cresol to 2,6-xylenol is controlled by controlling alkylation reaction conditions, and an oxidative coupling reaction catalyst is used together with an amine-based additive acting as a ligand for the catalyst, it is possible to prepare polyphenylene oxide with excellent processability in high yields.

Generally, ortho-cresol has a small difference in the boiling point from 2,6-xylenol, and thus there are problems in that its separation and purification are not easy, and high costs are required for the separation and purification. In contrast, in the present disclosure, the process of separating and purifying 2,6-xylenol from ortho-cresol may be omitted, and after production of polyphenylene oxide through the oxidative coupling reaction, ortho-cresol remaining in the reaction system is separated and removed by using the boiling point difference, thereby greatly reducing energy costs.

Further, in the present disclosure, the oxidative coupling reaction may be performed under mild conditions, as compared to the prior art, thereby improving process stability.

Meanwhile, in the present disclosure, the above steps, i.e., step 1 to step 3 may be performed by a series of consecutive reactions.

Hereinafter, each step will be described in detail.

Step 1

In the method for preparing polyphenylene oxide according to the present disclosure, the step 1 is preparing a mixture including 2,6-xylenol and ortho-cresol through an alkylation reaction of phenol.

In the method for preparing polyphenylene oxide according to the present disclosure, the mixture includes ortho-cresol at a molar ratio of 0.2 to 0.8 with respect to 1 mole of 2,6-xylenol.

Generally, the reaction product obtained resulting from the alkylation reaction includes 2,6-xylenol and ortho-cresol in an amount of 95% by weight or more, and 2,4,6-trimethylphenol in an amount of 5% by weight or less, based on the total weight of the reaction product. In addition, in 95% by weight or more of the mixture of 2,6-xylenol and ortho-cresol, 2,6-xylenol is present in an amount of 60% by weight or more, ortho-cresol is present in an amount of 40% by weight or less, more specifically, 2,6-xylenol is present in an amount of 75% by weight to 80% by weight, and ortho-cresol is present in an amount of 20% by weight to 25% by weight. Accordingly, in the traditional method for preparing polyphenylene oxide, in order to prevent or minimize the effect of ortho-cresol, a process of separating and removing ortho-cresol from the reaction product obtained after the alkylation reaction is essentially performed, and 2,6-xylenol, from which ortho-cresol is separated and removed, has been used.

However, the present inventors confirmed that ortho-cresol within the optimal content range improves a dielectric constant of the solvent and solubility of the catalyst during the oxidative coupling reaction for the preparation of polyphenylene oxide, and they controlled the content of ortho-cresol in the mixture used in the preparation of polyphenylene oxide.

Accordingly, in the method for preparing polyphenylene oxide according to the present disclosure, a process of separating and removing ortho-cresol which is produced together with 2,6-xylenol is not performed, after the alkylation reaction. As a result, in the present disclosure, the content of ortho-cresol in the mixture used in the subsequent oxidative coupling reaction step is higher than the content of ortho-cresol which is included as a by-product of 2,6-xylenol, as described in the prior art.

Specifically, the mixture includes ortho-cresol at a molar ratio of 0.2 to 0.8 with respect to 1 mole of 2,6-xylenol, and thus the ortho-cresol may improve the dielectric constant of the solvent used in the oxidative coupling reaction and the solubility of the catalyst, and as a result, the yield of PPO may be improved. When the content of ortho-cresol is less than 0.2 mole, the effects of improving the dielectric constant of the solvent and the solubility of the catalyst are insignificant, and as a result, the yield of PPO may be lowered, and physical properties of PPO to be prepared, particularly, molecular weight distribution property may be deteriorated. When the amount of ortho-cresol used exceeds the molar ratio of 0.8, ortho-cresol is coordinated with the catalyst due to the excessively high content, which may reduce the catalyst activity, and ortho-cresol is copolymerized with PPO to be prepared, which may deteriorate physical properties of PPO. Considering the effect of improving processability by controlling a glass transition temperature (Tg), a number average molecular weight (Mn), and a molecular weight distribution (PDI) of PPO finally prepared, the mixture may include more specifically ortho-cresol in an amount of 0.2 moles or more, or 0.3 moles or more, or 0.35 moles or more, or 0.4 moles or more, or 0.45 moles or more, or 0.48 moles or more, and 0.8 moles or less, or 0.75 moles or less, or 0.6 moles or less, or 0.55 moles or less, or 0.5 moles or less with respect to 1 mole of 2,6-xylenol.

Accordingly, in the preparation method according to the present disclosure, the alkylation reaction in the step 1 may be performed by appropriately controlling the reaction conditions, such as the reactant and its input amount, the catalyst, or reaction temperature, etc., so as to satisfy the content ratio of ortho-cresol in the mixture finally obtained.

Specifically, during the alkylation reaction, methanol may be used at a ratio of 2 moles to 8 moles with respect to 1 mole of phenol. When the ratio of methanol to phenol is too small, the production amount of ortho-cresol greatly increases. On the contrary, when the ratio of methanol to phenol is large, the content of 2,6-xylenol increases, whereas there is a concern about generation of a side reaction due to unreacted methanol. Therefore, it is preferable that the input amount of methanol is appropriately controlled within the above range by considering the content ratio of 2,6-xylenol and ortho-cresol in the mixture including 2,6-xylenol and ortho-cresol obtained resulting from the alkylation reaction. More specifically, in order to achieve the above-described molar ratio condition, methanol may be used at a ratio of 2 moles or more, or 3 moles or more, and 8 moles or less, or 5 moles or less with respect to 1 mole of phenol.

Further, the alkylation reaction may be performed in the presence of an alkylation reaction catalyst, such as zirconium-tungsten-based catalysts, magnesium oxide-based catalysts, iron-vanadium oxide-based catalysts, manganese oxide-based catalysts, cobalt-ferrite-type catalysts, alumina catalysts, or Y-zeolite-type catalysts.

The alkylation reaction catalyst may be used in the form of a supported catalyst which is supported on a carrier such as silica, etc.

More specifically, in the present disclosure, a zirconium-tungsten-based catalyst exhibiting excellent catalytic activity during the alkylation reaction may be used, and the catalyst may be a supported catalyst which is supported on silica.

Further, during the alkylation reaction, water may be optionally introduced, and in this case, water may be introduced at a ratio of 3 moles or less, more specifically, 1 mole to 3 moles with respect to 1 mole of phenol.

Further, the alkylation reaction may be performed at a temperature of 250° C. to 500° C., more specifically, 250° C. or higher, or 300° C. or higher, 500° C. or lower, or 450° C. or lower.

Further, the alkylation reaction may be performed under a pressure condition of 1 atm to 3 atm, more specifically, 1 atm or higher, or 1.2 atm or higher, and 3 atm or lower, or 1.5 atm or lower.

Further, the alkylation reaction may be performed in an inert atmosphere such as nitrogen, argon, etc., and depending on the catalyst used, the alkylation reaction may be performed in a reducing atmosphere such as hydrogen, etc.

As a result of the alkylation reaction, ortho-cresol is generated together with 2,6-xylenol as by-products, and the generated ortho-cresol satisfies the content ratio condition as described above. Further, as needed, 2,6-xylenol or ortho-cresol may be further introduced to additionally control the content ratio of ortho-cresol to 2,6-xylenol within the content ratio range described above. In this case, the preparation method according to the present disclosure may further include, optionally, a process of introducing 2,6-xylenol or ortho-cresol to satisfy the above content condition of ortho-cresol in the mixture obtained after the alkylation reaction.

In addition, as a result of the alkylation reaction, isomers such as 2,4,6-trimethylphenol, etc. may be further generated as side reaction products. Accordingly, the mixture of the present disclosure may further include 2,4,6-trimethylphenol while including 2,6-xylenol and ortho-cresol by satisfying the above content ratio conditions. When the mixture further includes 2,4,6-trimethylphenol, 2,4,6-trimethylphenol may be further included in an amount of more than 0% by weight, or 0.0001% by weight or more, less than 2% by weight, or 1% by weight or less, or 0.1% by weight or less, or 0.01% by weight or less with respect to the total weight of the mixture.

Step 2

The step 2 is performing an oxidative coupling reaction of the mixture prepared in the step 1.

Specifically, the oxidative coupling reaction may be performed in the presence of a copper-based catalyst and an amine-based additive.

The copper-based catalyst may include a copper(I) compound such as copper(I) oxide, copper(I) halide, copper(I) sulfate, or copper(I) nitrate, etc.; a copper(II) compound such as copper(II) oxide, copper(II) halide, copper(II) sulfate, or copper(II) nitrate, etc.; or a salt thereof, and any one thereof or a mixture of two or more thereof may be used.

The copper-based catalyst may be used at a ratio of 0.001 mole to 0.1 mole with respect to 1 mole of 2,6-xylenol. When the copper-based catalyst is used in the above content range, the yield of polyphenylene oxide may be improved by the sufficient catalytic activity, and color development by the catalyst may be prevented. When the amount of the copper-based catalyst used is less than 0.001 mole, the yield of polyphenylene oxide is low, and when the amount is more than 0.1 mole, a large amount of acid treatment is needed for subsequent catalyst removal, and there is a concern about color development when the catalyst is not removed and remains. Considering the improvement of the above-described effects, the copper-based catalyst may be more specifically used in an amount of 0.001 mole or more, or 0.003 moles or more, or 0.005 moles or more, or 0.0075 moles or more, or 0.008 moles or more, or 0.01 mole or more, and 0.1 mole or less, or 0.05 moles or less, or 0.03 moles or less, based on 1 mole of 2,6-xylenol.

Meanwhile, the amine-based additive serves as a ligand for the copper-based catalyst.

Specifically, the amine-based additive includes a secondary amine, a pyridine-based compound, or a mixture thereof.

Specifically, the secondary amine has two $C_{1-20}$ aliphatic alkyl groups in the molecule. More specifically, the secondary amine has two $C_{1-20}$ linear or branched alkyl groups. Due to this structure, the coordination with the copper-based catalyst is easy, and as a result, the catalyst reactivity may be increased. Accordingly, the yield of polyphenylene oxide may be greatly increased, as compared to the case of using primary amines, tertiary amines, diamines containing two amino groups in the molecule, or secondary amines containing cycloalkyl groups or aromatic ring structures. Specific examples of the secondary amines may include dimethyl amine, diethyl amine, di-n-propyl amine, di-i-propyl amine, di-n-butyl amine (or dibutyl amine), di-i-butyl amine, di-t-butyl amine, dipentyl amine, dihexyl amine, dioctyl amine, didecyl amine, methylethyl amine, methylpropyl amine, or methylbutyl amine, etc., and any one thereof or a mixture of two or more thereof may be used.

Further, the pyridine-based compound may include, specifically, aminopyridine-based compounds such as 2-amino pyridine, 3-amino pyridine, 4-amino pyridine, 4-dimethylaminopyridine, 2,3-diamino pyridine, 2,5-diamino pyridine, 2,6-diamino pyridine, 2-amino-6-methyl pyridine, 3-amino-6-isopropyl pyridine, or 4-pyrrolidino pyridine, etc.; monoalkyl pyridine-based compounds such as 2-methyl pyridine, 3-methyl pyridine, or 4-methyl pyridine, etc.; or dialkyl pyridine-based compounds such as 2,3-dimethyl pyridine (or 2,3-lutidine), 2,4-dimethyl pyridine, 2,5-dimethyl pyridine, 2,6-dimethyl pyridine, 3,4-dimethylpyridine, or 3,5-dimethyl pyridine, etc., and any one thereof or a mixture of two or more thereof may be used. Further, the alkyl may be $C_{1-20}$ alkyl, or $C_{1-10}$ alkyl, or $C_{1-4}$ alkyl.

The amine-based additive may be appropriately selected and used according to the type of the above-described copper-based catalyst. When the copper-based catalyst and the amine-based additive are used in optimal combination, the yield of polyphenylene oxide is further increased, and the physical properties of the prepared polyphenylene oxide may also be further improved.

Specifically, when the copper(I) compound, specifically, copper(I) oxide, copper(I) halide, copper(I) sulfate, copper (I) nitrate, or a salt thereof is used as the copper-based catalyst, and a pyridine-based compound is used as the amine-based additive, the yield of polyphenylene oxide may be increased, and the processability of the polyphenylene oxide to be prepared may be improved. The copper(I) compound may be more specifically a copper(I) halide compound such as copper(I) chloride or copper(I) bromide, and much more specifically copper(I) chloride. In addition, the pyridine-based compound may be an aminopyridine-based compound such as 2-amino pyridine, 3-amino pyridine, or 4-amino pyridine. The aminopyridine-based compound may exhibit better effect of improving the yield of polyphenylene oxide and the effect of improving processability of polyphenylene oxide due to the structural feature of easy coordination with the catalyst.

When a copper(II) compound, specifically, copper(II) oxide, copper(II) halide, copper(II) sulfate, copper(II) nitrate, or a salt thereof is used as the copper-based catalyst, and a secondary amine is used as the amine-based additive, the yield of polyphenylene oxide may be increased, and the processability of polyphenylene oxide to be prepared may be improved. The copper(II) compound may be more specifically a copper(II) halide compound such as copper(II) chloride or copper(II) bromide, and more specifically, copper(II) chloride. In addition, the secondary amine may have two $C_{1-8}$ or $C_{2-6}$ chain alkyl groups, and more specifically, di-n-butylamine, diethylamine, di-n-hexylamine, or di-n-propylamine. The secondary amine may easily coordinate with the catalyst and the coordinated complex may also exhibit high reactivity, thereby further improving the yield of polyphenylene oxide, and achieving the effects of increasing the molecular weight of polyphenylene oxide to be prepared and improving thermal properties thereof.

The amine-based additive may be used at a ratio of 0.1 mole to 1 mole, based on 1 mole of 2,6-xylenol. When the amine-based additive is used to satisfy the above-described content ratio, polyphenylene oxide may be prepared in excellent yields without concern about side reactions caused by the excessive amount of the amine-based additive. More specifically, the amine-based additive may be used in an amount of 0.1 mole or more, or 0.2 moles or more, or 0.3 moles or more, or 0.34 moles or more, or 0.4 moles or more, and 1 mole or less, or 0.8 moles or less, or 0.7 moles or less, or 0.68 moles or less, or 0.5 moles or less, based on 1 mole of 2,6-xylenol.

Further, in the preparation method according to the present disclosure, the oxidative coupling reaction may be performed under oxygen or air conditions. In particular, since the oxidative coupling reaction may be performed even under air conditions, it is possible to perform the preparation process under mild reaction conditions, as compared to the traditional oxidative coupling reaction which is performed under oxygen feeding condition. More specifically, the oxidative coupling reaction may be performed by feeding air at a rate of 80 cc/min to 350 cc/min by air bubbling.

In addition, the content of oxygen in the air may be specifically 30% or less, more specifically, 21% or less and 10% or more. Oxygen in the air acts to promote the oxidative coupling reaction, but when the oxidative coupling reaction is performed under the oxygen feeding condition as in the prior art, the yield is reduced and there is a problem such as explosion, etc. In contrast, in the present disclosure, process safety and yield may be improved by performing the oxidative coupling reaction under air condition with the low oxygen content, as described above.

Further, the air may be fed at a rate of 80 cc/min to 350 cc/min as described above. When the feeding rate is too slow, it is difficult to uniformly mix air in the reaction system, and as a result, the yield of polyphenylene oxide may be reduced, and the chain extension may be limited, thereby reducing physical properties. In addition, when the feeding rate is too fast, the oxygen concentration in the solvent increases, and thus ortho-cresol is copolymerized, or the coupling reaction of 2,6-xylenol occurs, and thus there is a concern about generation of by-products. In the present disclosure, the effects of improving the yield and physical properties of polyphenylene oxide may be further improved by feeding air in the above range of feeing rate. More specifically, the air may be fed by air bubbling at a rate of 80 cc/min or more, or 90 cc/min or more, or 100 cc/min or more, and 350 cc/min or less, or 330 cc/min or less, or 300 cc/min or less.

In addition, the air may be fed by air bubbling under the conditions satisfying the above-described feeding rate such that it may be uniformly mixed in the reaction system.

The oxidative coupling reaction may be performed in an aromatic solvent such as benzene, toluene, or xylene. These aromatic solvents may be more advantageous in the preparation of polyphenylene oxide because they exhibit high solubility for the catalyst and polyphenylene oxide.

Step 3

The step 3 is separating ortho-cresol from the reaction product obtained resulting from the step 2 and obtaining polyphenylene oxide.

In this regard, the order of performing the process of separating ortho-cresol and the process of obtaining polyphenylene oxide is not particularly limited. Specifically, after obtaining polyphenylene oxide, the process of separating ortho-cresol may be performed. Alternatively, after separating ortho-cresol, the process of obtaining polyphenylene oxide may be performed. Alternatively, polyphenylene oxide may be obtained through the process of separating ortho cresol.

For example, when the process of separating ortho-cresol is performed after the process of obtaining polyphenylene oxide, alcohol is introduced to the reaction product obtained resulting from the oxidative coupling reaction to precipitate polyphenylene oxide, followed by filtration and drying, and then the filtrate obtained resulting from the filtration is subjected to fractional distillation in a temperature range of 180° C. to 220° C., or 190° C. to 200° C., thereby separating ortho-cresol.

As the alcohol which is introduced to precipitate polyphenylene oxide, specifically, lower alcohols having 1 to 3 carbon atoms, such as methanol, ethanol, isopropyl alcohol, etc., may be used. Among them, when methanol is introduced, polyphenylene oxide may be precipitated in a better yield, and it is also more advantageous in terms of removal through the subsequent fractional distillation.

The amount of alcohol to be introduced is not particularly limited, and alcohol is introduced such that the sufficient precipitation reaction with polyphenylene oxide may occur.

In addition, when the alcohol is introduced, an acid such as hydrochloric acid, etc. may be optionally added in order to promote the precipitation reaction of polyphenylene oxide and to improve the yield thereby. At this time, the acid may be introduced in an amount of 0.01 part by weight to 0.5 parts by weight, more specifically, 0.1 part by weight to 0.3 parts by weight, based on 100 parts by weight of the alcohol.

When polyphenylene oxide is precipitated by the introduction of alcohol, it may be obtained by separating through filtration and by drying the separated polyphenylene oxide.

In this regard, the filtration and drying processes may be performed according to common methods. For example, the filtration may be performed using a filter, and the drying may be performed by heating and drying using an oven, etc. In addition, the drying is preferably performed under vacuum or in an inert gas atmosphere.

Further, the precipitation, filtration, and drying processes for obtaining polyphenylene oxide may be repeated twice or more.

After obtaining polyphenylene oxide through the precipitation, filtration, and drying, the filtrate obtained resulting from the filtration process is subjected to a fractional distillation process in a temperature range of 180° C. to 220° C., or 190° C. to 210° C., thereby separating ortho-cresol.

The fractional distillation process of separating ortho-cresol may be performed according to a common method, except that it is performed under the above temperature conditions. Meanwhile, isomers such as 2,4,6-trimethylphenol, etc., which are generated through side reaction during the oxidative coupling reaction, an aromatic hydrocarbon solvent such as toluene, etc., which is used in the oxidative coupling reaction, and alcohol, etc., which is introduced during the precipitation reaction of polyphenylene oxide, remain in the filtrate, in addition to ortho-cresol. These compounds may also be separated and removed through the fractional distillation. For example, when heating in the above temperature range, the alcohol having a low boiling point is first separated and removed through evaporation in a temperature range of 50° C. to 80° C., or 60° C. to 80° C., and subsequently, the aromatic hydrocarbon solvent such as toluene, etc. is separated and removed through evaporation in a temperature range of 100° C. to 150° C., or 110° C. to 130° C., and then ortho cresol may be separated and removed in a temperature range of 180° C. to 220° C., or 190° C. to 210° C.

For another example, when the process of obtaining polyphenylene oxide is performed after separating ortho-cresol from the reaction product obtained resulting from the step 2, the reaction product obtained resulting from the step 2 is subjected to fractional distillation in a temperature range of 180° C. to 220° C., or 190° C. to 210° C. to separate ortho-cresol, and then alcohol is introduced to the resulting reaction product to precipitate polyphenylene oxide, followed by filtration and drying.

Although polyphenylene oxide is produced as a result of the oxidative coupling reaction of the step 2, ortho cresol is present in the mixture added during the oxidative coupling reaction in the reaction system. Since there is a large difference between the boiling point of ortho cresol and the boiling point (or degradation temperature) of polyphenylene oxide, ortho-cresol may be separated and removed through fractional distillation in the present disclosure. Specifically, since the boiling point of ortho-cresol is 191° C. and the degradation temperature of polyphenylene oxide is 400° C. or higher, ortho-cresol may be isolated through fractional distillation in the temperature range of 180° C. to 220° C., or 190° C. to 200° C.

The fractional distillation process of separating ortho-cresol may be performed according to a common method, except that it is performed under the above temperature conditions.

In addition, in the reaction product obtained resulting from the step 2, isomers such as 2,4,6-trimethylphenol may also be present, in addition to ortho cresol. Since these isomers also have a large difference in the boiling point from polyphenylene oxide, these isomers may be simultaneously separated by the fractional distillation process, and as a result, polyphenylene oxide may be obtained with higher purity.

After separating ortho-cresol, alcohol is introduced to the resulting reaction product, and polyphenylene oxide is obtained by precipitating, filtering, and separating.

At this time, the processes of precipitating, filtering, and separating polyphenylene oxide process may be performed in the same manner as described above. However, when the resulting reaction product is obtained in a solid phase, the reaction product is dissolved in a solvent, and then alcohol is introduced to perform the precipitation reaction of polyphenylene oxide.

Meanwhile, ortho-cresol separated through the fractional distillation may be reused as an intermediate in the synthesis of 2,6-xylenol in the alkylation reaction for the preparation of 2,6-xylenol. Accordingly, the preparation method according to the present disclosure may further include a step of introducing the separated ortho-cresol during the alkylation reaction, after separating ortho-cresol.

By the above preparation method, PPO may be prepared in excellent yields under mild oxidative coupling reaction conditions. Specifically, PPO may be prepared by the above-described preparation method in a high yield of 70% by weight or more, or 80% by weight or more, or 90% by weight or more, or 95% by weight or more, or 99% by weight or more.

In this regard, the yield may be calculated according to the following Equation 1 from the amount of 2,6-xylenol introduced during the preparation of PPO, and the amount of PPO finally prepared.

$$\text{Yield (\% by weight)}=[\text{Weight of PPO prepared}/\text{Weight of 2,6-xylenol introduced}]\times 100 \quad \text{[Equation 1]}$$

Further, PPO prepared according to the above preparation method is a linear homopolymer consisting of only a repeating unit represented by Chemical Formula 1:

[Chemical Formula 1]

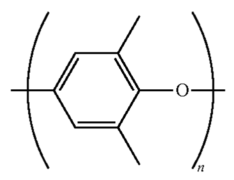

in Chemical Formula 1, n may be an integer of 1 or more, more specifically, 10 to 100.

In the preparation of polyphenylene oxide according to the traditional preparation method, the structure derived from ortho-cresol included as a by-product in 2,6-xylenol is included as a repeating unit of the polymer. In contrast, in the preparation method according to the present disclosure, even though a high content of ortho-cresol is included as the reactant, high selectivity for 2,6-xylenol is exhibited, and thus the above-described homopolymer may be prepared.

Accordingly, PPO prepared according to the above preparation method shows no peak of ortho-cresol in the range of 6.8 ppm to 7.4 ppm in $^1$H NMR analysis.

The $^1$H NMR analysis of PPO may be performed by a method and conditions which are described in Experimental Example below.

In addition, PPO prepared by the above preparation method is an oligomeric PPO having a number average molecular weight of 1,600 g/mol to 3,500 g/mol, and it has a molecular weight distribution (PDI, Mw/Mn) of 1.7 to 3 and a glass transition temperature (Tg) of 140° C. to 180° C., thereby exhibiting excellent processability.

Specifically, the PPO has a number average molecular weight of 1,600 g/mol or more, 3,500 g/mol or less, or 3,000 g/mol or less, and thus has a high Mn, as compared to the oligomeric PPO prepared according to the traditional preparation method. Therefore, compounds prepared by using the same may exhibit excellent processability. More specifically, the number average molecular weight of PPO is 1,600 g/mol or more, 1,750 g/mol or more, or 1,900 g/mol or more, or 2,000 g/mol or more, or 2,100 g/mol or more, or 2,200 g/mol or more or 2,300 g/mol or more, or 2,400 g/mol or more, and 3,500 g/mol or less, or 3,300 g/mol or less, or 3,200 g/mol or less, or 3,000 g/mol or less, or 2,800 g/mol or less, or 2,700 g/mol or less.

In addition, the PPO has a molecular weight distribution (PDI, Mw/Mn) of 1.7 to 3, and thus has a wide molecular weight distribution, as compared to the oligomeric PPO prepared according to the traditional preparation method. As a result, the PPO may exhibit excellent processability. More specifically, the molecular weight distribution of PPO is 1.7 or more, or 1.8 or more, or 1.9 or more, or 2.0 or more, or 2.1 or more, 2.2 or more, or 2.3 or more, or 2.45 or more, and 3 or less, or 2.8 or less, or 2.7 or less, or 2.5 or less.

In addition, the PPO has a glass transition temperature of 140° C. to 180° C. When the glass transition temperature is high, the processing temperature increases and processability decreases, and when the glass transition temperature is low, thermal stability decreases. The PPO according to the present disclosure may exhibit excellent processability without deterioration in thermal stability, as it has a glass transition temperature within the above range. More specifically, the glass transition temperature of PPO is 140° C. or higher, or 145° C. or higher, or 148° C. or higher, or 150° C. or higher, or 152° C. or higher, or 155° C. or higher, or 156° C. or higher, and 180° C. or lower, or 175° C. or lower, or 170° C. or lower, or 169° C. or lower, or 165° C. or lower, or 162° C. or lower, or 160° C. or lower, or 159° C. or lower.

Meanwhile, the number average molecular weight and the molecular weight distribution (PDI, Mw/Mn) of PPO may be measured using gel permeation chromatography, and the glass transition temperature may be measured using a differential scanning calorimeter. Specific measurement methods and conditions will be described in detail in Experimental Example below.

In addition, when an oxidative coupling reaction is additionally performed on the oligomeric PPO prepared by the above-described preparation method in the presence of the copper catalyst and the amine-based additive, high-molecular-weight PPO (or polymeric PPO), specifically, high-molecular-weight PPO with a high number average molecular weight of 4,000 g/mol or more may be prepared. Accordingly, the preparation method according to the present disclosure may further include the step of performing a secondary oxidative coupling reaction on the obtained polyphenylene oxide, specifically, oligomeric PPO in the presence of the copper-based catalyst and the amine-based additive, after separating the ortho-cresol.

The copper-based catalyst, amine-based additive, and oxidative coupling reaction conditions applicable in the preparation of the high-molecular-weight PPO are as described above.

However, the copper-based catalyst may be used at a ratio of 0.001 mole to 0.1 mole, based on 1 mole of the oligomeric PPO, more specifically, 0.001 mole or more, or 0.003 moles or more, or 0.005 moles or more, and 0.1 mole or less, or 0.05 moles or less, or 0.01 mole or less, based on 1 mole of the oligomeric PPO.

In addition, the amine-based additive may be used at a ratio of 0.1 mole to 1 mole, based on 1 mole of the oligomeric PPO, more specifically, 0.1 mole or more, or 0.3 moles or more, or 0.5 moles or more, and 1 mole or less, or 0.8 moles or less, or 0.7 moles or less, or 0.68 moles or less, based on 1 mole of the oligomeric PPO.

The number average molecular weight of the high-molecular-weight PPO prepared by the above preparation process is specifically 4,000 g/mol or more, or 5,000 g/mol or more, or 8,000 g/mol or more, or 10,000 g/mol or more, or 12,000 g/mol or more, and 20,000 g/mol or less, or 18,000 g/mol or less, or 16,500 g/mol or less, or 16,200 g/mol or less, or 15,000 g/mol or less.

In addition to the above number average molecular weight, the high-molecular-weight PPO has a wide molecular weight distribution (PDI, Mw/Mn) of 2 to 3, more specifically, 2 or more, or 2.1 or more, or 2.2 or more, and 3 or less, or 2.8 or less, or 2.6 or less, or 2.5 or less, as compared to those in the prior art, thereby exhibiting excellent processability.

Meanwhile, the number average molecular weight and the molecular weight distribution of the polymeric PPO may be measured using gel permeation chromatography, and specific measurement methods and conditions will be described in detail in Experimental Example below.

According to a preparation method of the present disclosure, a separate separation and purification process for ortho-cresol which is generated after an alkylation reaction of phenol is unnecessary, and thus energy costs may be reduced, and PPO may be prepared in excellent yields under mild oxidative coupling reaction conditions. In addition, the prepared PPO may exhibit excellent processability.

BRIEF DESCRIPTION OF DRAWINGS

FIG. 1 is a spectrum of $^1H$ NMR analysis of polyphenylene oxide prepared in Example 1-1.

DETAILED DESCRIPTION OF THE EMBODIMENTS

Hereinafter, the actions and effects of the present disclosure will be described in more detail with reference to specific exemplary embodiments of the present disclosure. However, these exemplary embodiments are provided only for illustrating the present disclosure, and the scope of the present disclosure is not defined thereby.

Example 1-1

10 g of fumed silica was added to 50 ml of methanol, and then 1 g of $ZrO_2$ was added. An ammonia solution was added to the resulting mixture such that pH was 9 or more. Thereafter, stirring was carried out at room temperature (25±3° C.) for 3 hours, and the solvent was completely removed through a glass filter, and dried in an oven at 110° C. The resulting dry product was mixed with a solution prepared by dissolving 1.4 g of WO 3 in 20 mL of water, and allowed to react at room temperature (25±3° C.) for 2 hours. The solvent was completely removed from the resulting reaction product through a glass filter, and calcined at 750° C. to prepare a zirconium-tungsten-based alkylation catalyst in which zirconium and tungsten were supported on a silica carrier.

10 g of the alkylation catalyst prepared above was charged in a cylindrical reactor, and the alkylation catalyst was activated by raising the temperature in the reactor to 400° C. while flowing a mixed gas (including 97% by volume of argon and 3% by volume of hydrogen). After the activation was completed, a mixture of phenol, methanol, and water (a mixing molar ratio of phenol:methanol:water=1:5:1) was injected together with the mixed gas at a rate of 10 mL/h and allowed to react until the phenol conversion rate reached 98%. As a result, a mixture including 2,6-xylenol and ortho-cresol was obtained.

About 1.43 g of the mixture thus obtained (including 2,6-xylenol (1 g, 8.2 mmol) and ortho-cresol (0.43 g, 4 mmol, corresponding to a molar ratio of 0.49, based on 1 mole of 2,6-xylenol)) was placed in a glass jar with a magnetic bar, and 10 ml of toluene was added thereto and dissolved under stirring.

Catalyst $CuCl_2$ was added to the resulting solution at a molar ratio of 0.0075, based on 1 mole of 2,6-xylenol, stirred at 25° C. for 5 minutes, and then 2.8 mmol of di-n-butylamine (corresponding to a molar ratio of 0.34, based on 1 mole of 2,6-xylenol) was added, and air bubbling was carried out to perform a polymerization reaction. At this time, air bubbling was carried at a rate of 100 cc/min using a flow controller.

After the reaction was completed, the resulting reaction product was slowly put into a flask containing 100 ml of HCl/MeOH solution (HCl content: 0.1% by weight) to precipitate the synthesized polymer, i.e., polyphenylene oxide. The precipitated polymer was isolated by filtration with a filter, and dried in a vacuum oven. The dried polymer was dissolved in dichloromethane, and then a process of precipitation using methanol was repeated twice to obtain polyphenylene oxide.

In the solution remaining after separating the polyphenylene oxide, methanol, toluene, and ortho-cresol were included. Accordingly, while heating the solution to 190° C. to 220° C., methanol, toluene, and ortho-cresol were sequentially separated by fractional distillation around the temperature of 65° C., 110° C., and 190° C. In addition, ortho-cresol separated through the fractional distillation was then recycled as an intermediate during the alkylation reaction of 2,6-xylenol.

Examples 1-2 to 1-10

Each polyphenylene oxide was prepared in the same manner as in Example 1-1, except that the input amounts of the reactants and polymerization conditions were changed as shown in Table 1 below.

Example 1-11

10 g of fumed silica was added to 50 ml of methanol, and then 1 g of $ZrO_2$ was added. An ammonia solution was added to the resulting mixture such that pH was 9 or more. Thereafter, stirring was carried out at room temperature (25±3° C.) for 3 hours, and the solvent was completely removed through a glass filter, and dried in an oven at 110° C. The resulting dry product was mixed with a solution prepared by dissolving 1.4 g of WO 3 in 20 mL of water, and allowed to react at room temperature (25±3° C.) for 2 hours. The solvent was completely removed from the resulting reaction product through a glass filter, and calcined at 750° C. to prepare a zirconium-tungsten-based alkylation catalyst in which zirconium and tungsten were supported on a silica carrier.

10 g of the alkylation catalyst prepared above was charged in a cylindrical reactor, and the alkylation catalyst was activated by raising the temperature in the reactor to 400° C. while flowing a mixed gas (including 97% by volume of argon and 3% by volume of hydrogen). After the activation was completed, a mixture of phenol, methanol, and water (a mixing molar ratio of phenol:methanol:water=1:5:1) was injected together with the mixed gas at a rate of 10 mL/h and allowed to react until the phenol conversion rate reached 98%. As a result, a mixture including 2,6-xylenol and ortho-cresol was obtained.

About 1.43 g of the mixture thus obtained (including 2,6-xylenol (1 g, 8.2 mmol) and ortho-cresol (0.43 g, 4 mmol, corresponding to a molar ratio of 0.49, based on 1 mole of 2,6-xylenol)) was placed in a glass jar with a magnetic bar, and 10 ml of toluene was added thereto and dissolved under stirring.

Catalyst CuCl was added to the resulting solution at a molar ratio of 0.01, based on 1 mole of 2,6-xylenol, stirred at 25° C. for 5 minutes, and then 2.8 mmol of 3-aminopyridine (corresponding to a molar ratio of 0.34, based on 1 mole of 2,6-xylenol) was added, and air bubbling was carried out to perform a polymerization reaction. At this time, air bubbling was carried at a rate of 100 cc/min using a flow controller.

After the reaction was completed, the resulting reaction product was slowly put into a flask containing 100 ml of HCl/MeOH solution (HCl content: 0.1% by weight) to precipitate the synthesized polymer, i.e., polyphenylene oxide. The precipitated polymer was isolated by filtration with a filter, and dried in a vacuum oven. The dried polymer was dissolved in dichloromethane, and then a process of precipitation using methanol was repeated twice to obtain polyphenylene oxide.

In the solution remaining after separating the polyphenylene oxide, methanol, toluene, and ortho-cresol were included. Accordingly, while heating the solution to 190° C. to 220° C., methanol, toluene, and ortho-cresol were sequentially separated by fractional distillation around the temperature of 65° C., 110° C., and 190° C. In addition, ortho-cresol separated through the fractional distillation was then recycled as an intermediate during the alkylation reaction of 2,6-xylenol.

Examples 1-12 to 1-19

Each polyphenylene oxide was prepared in the same manner as in Example 1-11, except that the input amounts of the reactants and polymerization conditions were changed as shown in Table 2 below.

Meanwhile, in Examples 1-17 and 1-18, the content of ortho-cresol in the mixture corresponds to a molar ratio of 0.61 and 0.73, based on 1 mole of 2,6-xylenol, respectively.

Comparative Example 1-1

Polyphenylene oxide was prepared in the same manner as in Example 1-1, except that no alkylation reaction was performed, and 2,6-xylene (1 g, 8.2 mmol) was used instead of the mixture including 2,6-xylenol and ortho-cresol.

Comparative Example 1-2

Polyphenylene oxide was prepared in the same manner as in Example 1-1, except that the input amounts of the reactants and polymerization conditions were changed as shown in Table 1 below.

Comparative Example 1-3

Polyphenylene oxide was prepared in the same manner as in Example 1-1, except that no alkylation reaction was performed, and ortho-cresol (9.2 mmol) was used instead of the mixture including 2,6-xylenol and ortho-cresol. However, polyphenylene oxide was not prepared due to lack of reactivity.

Comparative Examples 1-4 and 1-5

Each polyphenylene oxide was prepared in the same manner as in Example 1-1, except that the input amounts of the reactants and polymerization conditions were changed as shown in Table 1 below.

Comparative Example 1-6

Polyphenylene oxide was prepared in the same manner as in Example 1-11, except that the input amounts of the reactants and polymerization conditions were changed as shown in Table 2 below.

Comparative Example 1-7

Polyphenylene oxide was prepared in the same manner as in Example 1-11, except that no alkylation reaction was performed, and 2,6-xylene (1 g, 8.2 mmol) was used instead of the mixture including 2,6-xylenol and ortho-cresol.

Comparative Examples 1-8 and 1-9

Each polyphenylene oxide was prepared in the same manner as in Example 1-11, except that the input amounts of the reactants and polymerization conditions were changed as shown in Table 2 below.

TABLE 1

| | 2,6-Xylene (mmol) | Ortho-cresol (mole, based on 1 mole of 2,6-xylenol) | Catalyst (mole, based on 1 mole of 2,6-xylenol) | Amine-based additive (mole, based on 1 mole of 2,6-xylenol) | Air bubbling (cc/min) | Temperature (° C.) |
|---|---|---|---|---|---|---|
| Example 1-1 | 2,6-xylene (8.2) | ortho-cresol (0.49) | $CuCl_2$ (0.0075) | di-n-butyl amine (0.34) | Air (300) | 25 |
| Example 1-2 | 2,6-xylene (8.2) | ortho-cresol (0.49) | $CuCl_2$ (0.01) | di-n-butyl amine (0.34) | Air (300) | 25 |
| Example 1-3 | 2,6-xylene (8.2) | ortho-cresol (0.49) | $CuCl_2$ (0.01) | di-n-butyl amine (0.34) | Air (300) | 40 |
| Example 1-4 | 2,6-xylene (8.2) | ortho-cresol (0.49) | $CuCl_2$ (0.01) | di-n-butyl amine (0.68) | Air (300) | 40 |
| Example 1-5 | 2,6-xylene (8.2) | ortho-cresol (0.49) | $CuCl_2$ (0.01) | di-n-butyl amine (0.34) | $O_2$ (100) | 25 |
| Example 1-6 | 2,6-xylene (8.2) | ortho-cresol (0.55) | $CuCl_2$ (0.01) | di-n-butyl amine (0.34) | Air (300) | 25 |
| Example 1-7 | 2,6-xylene (8.2) | ortho-cresol (0.30) | $CuCl_2$ (0.01) | di-n-butyl amine (0.34) | Air (300) | 25 |
| Example 1-8 | 2,6-xylene (8.2) | ortho-cresol (0.49) | $CuCl_2$ (0.01) | di-n-hexylamine (0.34) | Air (300) | 25 |
| Example 1-9 | 2,6-xylene (8.2) | ortho-cresol (0.49) | $CuBr_2$ (0.01) | di-n-butyl amine (0.34) | Air (300) | 25 |
| Example 1-10 | 2,6-xylene (8.2) | ortho-cresol (0.73) | $CuCl_2$ (0.01) | di-n-butyl amine (0.34) | Air (300) | 25 |
| Comparative Example 1-1 | 2,6-xylene (8.2) | — | $CuCl_2$ (0.05) | di-n-butyl amine (0.34) | Air (300) | 25 |
| Comparative Example 1-2 | 2,6-xylene (4.6) | ortho-cresol (1) | $CuCl_2$ (0.01) | di-n-butyl amine (0.34) | Air (300) | 25 |
| Comparative Example 1-3 | — | ortho-cresol | $CuCl_2$ (0.01) | di-n-butyl amine (0.34) | Air (300) | 25 |
| Comparative Example 1-4 | 2,6-xylene (8.2) | ortho-cresol (0.49) | $CuCl_2$ (0.01) | triethylamine (0.34) | Air (300) | 25 |
| Comparative Example 1-5 | 2,6-xylene (8.2) | ortho-cresol (0.1) | $CuCl_2$ (0.01) | triethylamine (0.34) | Air (300) | 25 |

TABLE 2

| | 2,6-Xylene (mmol) | Ortho-cresol (mole, based on 1 mole of 2,6-xylenol) | Catalyst (mole, based on 1 mole of 2,6-xylenol) | Amine-based additive (mole, based on 1 mole of 2,6-xylenol) | Air bubbling (cc/min) | Temperature (° C.) |
|---|---|---|---|---|---|---|
| Example 1-11 | 2,6-xylene (8.2) | ortho-cresol (0.49) | CuCl (0.01) | 3-aminopyridine (0.34) | Air (100) | 25 |
| Example 1-12 | 2,6-xylene (8.2) | ortho-cresol (0.49) | CuCl (0.01) | 3-aminopyridine (0.34) | Air (300) | 40 |
| Example 1-13 | 2,6-xylene (8.2) | ortho-cresol (0.49) | CuCl (0.005) | 3-aminopyridine (0.34) | Air (300) | 40 |

TABLE 2-continued

| | 2,6-Xylene (mmol) | Ortho-cresol (mole, based on 1 mole of 2,6-xylenol) | Catalyst (mole, based on 1 mole of 2,6-xylenol) | Amine-based additive (mole, based on 1 mole of 2,6-xylenol) | Air bubbling (cc/min) | Temperature (° C.) |
|---|---|---|---|---|---|---|
| Example 1-14 | 2,6-xylene (8.2) | ortho-cresol (0.49) | CuCl (0.01) | 3-aminopyridine (0.34) | Air (300) | 25 |
| Example 1-15 | 2,6-xylene (8.2) | ortho-cresol (0.49) | CuCl (0.01) | 2-methyl pyridine (0.34) | Air (100) | 25 |
| Example 1-16 | 2,6-xylene (8.2) | ortho-cresol (0.49) | CuBr (0.01) | 3-aminopyridine (0.34) | Air (100) | 25 |
| Example 1-17 | 2,6-xylene (8.2) | ortho-cresol (0.61) | CuCl (0.01) | 3-aminopyridine (0.34) | Air (100) | 25 |
| Example 1-18 | 2,6-xylene (8.2) | ortho-cresol (0.73) | CuCl (0.01) | 3-aminopyridine (0.34) | Air (100) | 25 |
| Example 1-19 | 2,6-xylene (8.2) | ortho-cresol (0.3) | CuCl (0.01) | 3-aminopyridine (0.34) | Air (100) | 25 |
| Comparative Example 1-6 | 2,6-xylene (8.2) | ortho-cresol (0.49) | CuCl (0.01) | n-butylamine (0.34) | Air (300) | 25 |
| Comparative Example 1-7 | 2,6-xylene (8.2) | — | CuCl (0.01) | 3-aminopyridine (0.34) | Air (300) | 25 |
| Comparative Example 1-8 | 2,6-xylene (8.2) | ortho-cresol (1) | CuCl (0.01) | 3-aminopyridine (0.34) | Air (300) | 25 |
| Comparative Example 1-9 | 2,6-xylene (8.2) | ortho-cresol (0.1) | CuCl (0.01) | 3-aminopyridine (0.34) | Air (300) | 25 |

Experimental Example 1

NMR analysis was performed on the polyphenylene oxide (PPO) obtained in Example 1-1.

In detail, the PPO prepared in Example 1-1 was dissolved in $CDCl_3$, and then $^1H$ NMR analysis was performed using Varian's 500 MHz NMR. The results are shown in FIG. 1.

According to the reported literature, when ortho-cresol is copolymerized with a polymer, a peak of ortho-cresol is observed in the range of 6.8 ppm to 7.4 ppm in the $^1H$ NMR spectrum. However, as shown in FIG. 1, the peak of ortho-cresol was not observed in the PPO of Example 1-1, which was prepared by the preparation method of the present disclosure.

This indicates that the PPO prepared by the preparation method of the present disclosure is a homopolymer consisting of only a repeating unit derived from 2,6-xylenol.

Experimental Example 2

For the PPOs obtained in Examples and Comparative Examples, their yield, glass transition temperature, number average molecular weight, and molecular weight distribution were measured by the following methods, and the results are shown in Tables 3 and 4 below.

(1) Yield (%)

The yield was calculated according to the following Equation 1 from the amount of 2,6-xylenol introduced during the preparation of PPO according to Examples and Comparative Examples, and the amount of PPO finally prepared.

Yield (% by weight)=[Weight of PPO prepared/Weight of 2,6-xylenol introduced]×100 [Equation 1]

(2) Glass Transition Temperature (Tg)

The glass transition temperature was measured using a differential scanning calorimeter (DSC) under the following conditions:

Measurement instrument: DSC 250 (TA Instruments)

Measurement temperature: 0 to 300° C.

Heating rate: 10° C./min

Measurement environment: $N_2$ (3) Number Average Molecular Weight (Mn) and Molecular Weight Distribution (PDI)

Each of the polymers prepared in Examples and Comparative Examples was dissolved in chloroform, and then gel permeation chromatography (GPC) analysis was performed under the following conditions, and from the results, the number average molecular weight (Mn) and the molecular weight distribution (PDI) of PPO were calculated.

As a GPC instrument, a Waters' PL-GPC220 instrument was used, and a Polymer Laboratories' PLgel MIX-B 300 mm-long column was used. At this time, the measurement temperature was 40° C., chloroform was used as a solvent, and a flow rate was 1.0 mL/min. Each of the polymer samples according to Examples and Comparative Examples was pretreated by dissolving in chloroform containing 0.0125% BHT at 160° C. for 10 hours using the GPC analysis instrument (PL-GP220), and then prepared at a concentration of 1 mg/l mL, and then fed in an amount of 100 μl. The weight average molecular weight (Mw) and number average molecular weight (Mn) values were derived using a calibration curve formed using polystyrene standard specimens, and the molecular weight distribution (PDI, Mw/Mn) was calculated by dividing the weight average molecular weight by the number average molecular weight. At this time, 9 kinds of polystyrene standard specimens having the weight average molecular weight (Mw) of 2000 g/mol, 10000 g/mol, 30000 g/mol, 70000 g/mol, 200000 g/mol, 700000 g/mol, 2000000 g/mol, 4000000 g/mol, 10000000 g/mol were used.

<Measurement Conditions>

Column: PLgel Mixed-B×2
Solvent: chloroform (stabilized with BHT)
Flow rate: 1.0 ml/min
Sample concentration: 1 mg/ml
Feeding volume: 100 μl
Column temperature: 40° C.
Detector: Waters RI detector
Data processing: Empower

TABLE 3

| | Yield (% by weight) | Tg (° C.) | Mn (g/mol) | PDI |
|---|---|---|---|---|
| Example 1-1 | 88 | 154 | 2,400 | 2.3 |
| Example 1-2 | 97 | 158 | 2,500 | 2.7 |
| Example 1-3 | 99 | 160 | 2,300 | 3.0 |
| Example 1-4 | 99 | 170 | 3,200 | 3.0 |
| Example 1-5 | 96 | 170 | 3,300 | 2.7 |
| Example 1-6 | 99 | 153 | 2,100 | 2.0 |
| Example 1-7 | 99 | 153 | 2,200 | 2.1 |
| Example 1-8 | 96 | 156 | 2,700 | 2.3 |
| Example 1-9 | 97 | 169 | 3,100 | 2.3 |
| Example 1-10 | 99 | 154 | 2,200 | 2.0 |
| Comparative Example 1-1 | 72 | 183 | 4,300 | 1.9 |
| Comparative Example 1-2 | 40 | 155 | 2,200 | 2.7 |
| Comparative Example 1-3 | ND | ND | ND | ND |
| Comparative Example 1-4 | 6 | 147 | 1,900 | 1.8 |
| Comparative Example 1-5 | 13 | 148 | 1,900 | 2.0 |

In Table 3, 'ND' means not determined.

TABLE 4

| | Yield (% by weight) | Tg (° C.) | Mn (g/mol) | PDI |
|---|---|---|---|---|
| Example 1-11 | 71 | 151 | 1,900 | 1.9 |
| Example 1-12 | 90 | 160 | 2,700 | 2.3 |
| Example 1-13 | 90 | 155 | 2,200 | 2.3 |
| Example 1-14 | >99 | 154 | 2,400 | 2.3 |
| Example 1-15 | 70 | 151 | 2,100 | 1.8 |
| Example 1-16 | >99 | 159 | 2,300 | 3.0 |
| Example 1-17 | 93 | 155 | 2,200 | 2.7 |
| Example 1-18 | 96 | 148 | 1,900 | 1.7 |
| Example 1-19 | 80 | 150 | 2100 | 1.9 |
| Comparative Example 1-6 | 31 | 149 | 1,800 | 1.5 |
| Comparative Example 1-7 | 9 | 137 | 1,700 | 1.6 |
| Comparative Example 1-8 | 40 | 149 | 2,000 | 2.1 |
| Comparative Example 1-9 | 15 | 147 | 1,800 | 2.0 |

As a result of the experiment, it was confirmed that due to the use of the copper-based catalyst and the amine-based additive of the present disclosure in combination, the yield of PPO was greatly increased, as compared to the prior art, and the prepared PPO had Tg, Mn, and PDI in the optimal range, thereby exhibiting excellent processability. It was also confirmed that polymerization of oligomeric PPO was possible even under mild conditions of air feeding by the preparation method of the present disclosure.

Specifically, from the experimental results of Examples 1-1 to 1-4, it was confirmed that when PPO was prepared by the preparation method according to the present disclosure, the yield was increased, as the amount of the catalyst was increased within the predetermined range, and Tg and molecular weight or PDI of PPO were increased, as the amount of the amine-based additive was increased.

It was also confirmed that when the aminopyridine-based compound was used as the amine-based additive, PPO having a higher molecular weight, a wider molecular weight distribution, and an optimal range of Tg and showing excellent processability may be prepared in significantly increased yields. On the other hand, in Example 1-15 in which the alkylpyridine-based compound was used, the yield was rather decreased due to the bulky nature of the alkylpyridine-based compound, as compared to Example 1-11 in which the aminopyridine-based compound was used.

From the results of Example 1-11 and Example 1-16, it was also confirmed that when copper(I) bromide was used instead of copper(I) chloride as the copper-based catalyst, there was no significant difference in the reactivity, but the molecular weight distribution of the prepared PPO was increased.

From the results of Examples 1-1, 1-7, and 1-8, it was also confirmed that as the content of ortho-cresol was increased to a certain level, Tg, the molecular weight, and the molecular weight distribution of the prepared PPO were increased under the same conditions, due to the excellent solubility of the catalyst. However, when the content of ortho-cresol exceeds the certain level, specifically, a molar ratio of 0.6 with respect to 1 mole of 2.6-xylene, Tg, the molecular weight, and the molecular weight distribution of the prepared PPO were relatively decreased.

In contrast, in Comparative Example 1-1, in which only 2,6-xylene was used without ortho-cresol, the yield of PPO was decreased despite the increase in the feeding amount of the catalyst, Tg and Mn of the prepared PPO were excessively increased, and PDI was decreased, resulting in poor processability, as compared to Examples 1-2, 1-5 and 1-6, in which 2,6-xylene and ortho-cresol were used at the optimal mixing ratio under the same conditions. Also, in Comparative Example 1-7, PPO polymerization did not proceed well, as compared to Example 1-14. These results show that ortho-cresol plays a role in improving the solvent's dielectric constant and the catalyst's solubility during the oxidative coupling reaction, but in Comparative Examples 1-1 and 1-7, the solubility of the catalyst was decreased, because ortho-cresol was not used.

Also, in Comparative Example 1-2, in which the mixture including 2,6-xylene and ortho-cresol in equal amounts was used, the yield of PPO was greatly decreased. In Comparative Example 1-3, in which only ortho-cresol was used without 2,6-xylene, PPO was not prepared due to lack of reactivity.

In addition, in Comparative Example 1-4 and Comparative Example 1-6, in which triethylamine and n-butylamine were used as the amine-based additive, respectively, the yield of PPO was greatly decreased, and Tg of the prepared PPO was low, and Mn and PDI were decreased, as compared to Examples 1-2, 1-8, and 1-14.

Example 2-1

The oligomeric polyphenylene oxide (PPO) prepared in Example 1-1 was placed in a glass jar with a magnetic bar, and 10 ml of toluene was added thereto and dissolved under stirring.

Catalyst $CuCl_2$ was added to the obtained solution at a molar ratio of 0.005, based on 1 mole of the oligomeric PPO, stirred at 25° C. for 5 minutes, and then di-n-butylamine as an amine-based additive was added at a molar ratio of 0.68, based on 1 mole of the oligomeric PPO, and air bubbling was carried out to perform a polymerization reaction. At this time, air bubbling was carried at a rate of 300 cc/min using a flow controller.

After the reaction was completed, the resulting reaction product was slowly put into a flask containing 100 ml of HCl/MeOH solution (HCl content: 0.1 wt %) to precipitate the synthesized polymer. The precipitated polymer was isolated by filtration with a filter, and dried in a vacuum oven. The dried polymer was dissolved in dichloromethane, and then a process of precipitation using methanol was repeated twice to obtain high-molecular-weight polyphenylene oxide.

Examples 2-2 and 2-3

Each polyphenylene oxide was prepared in the same manner as in Example 2-1, except that the input amounts of the reactants and polymerization conditions were changed as shown in Table 5 below.

Example 2-4

The oligomeric PPO prepared in Example 1-11 was placed in a glass jar with a magnetic bar, and 10 ml of toluene was added thereto and dissolved under stirring.

Catalyst $CuCl_2$ was added to the obtained solution at a molar ratio of 0.005, based on 1 mole of the oligomeric PPO, stirred at 25° C. for 5 minutes, and then di-n-butylamine as an amine-based additive was added at a molar ratio of 0.28, based on 1 mole of the oligomeric PPO, and air bubbling was carried out to perform a polymerization reaction. At this time, air bubbling was carried at a rate of 300 cc/min using a flow controller.

After the reaction was completed, the resulting reaction product was slowly put into a flask containing 100 ml of HCl/MeOH solution (HCl content: 0.1 wt %) to precipitate the synthesized polymer. The precipitated polymer was isolated by filtration with a filter, and dried in a vacuum oven. The dried polymer was dissolved in dichloromethane, and then a process of precipitation using methanol was repeated twice to obtain high-molecular-weight polyphenylene oxide.

Example 2-5

Polyphenylene oxide was prepared in the same manner as in Example 2-4, except that the input amounts of the reactants and polymerization conditions were changed as shown in Table 5 below.

Experimental Example 3

GPC analysis was performed on the high-molecular-weight polyphenylene oxides prepared in Examples 2-1 to 2-5 in the same manner as in Experimental Example 2, and their number average molecular weight (Mn) and molecular weight distribution (PDI, Mw/Mn) were measured. The results are shown in Table 5 below.

TABLE 5

| | Oligomeric PPO | Catalyst (mole, based on 1 mole of oligomeric PPO) | Amine-based additive (mole, based on 1 mole of oligomeric PPO) | Air bubbling (cc/min) | Temperature (° C.) | Mn (g/mol) | PDI |
|---|---|---|---|---|---|---|---|
| Example 2-1 | Example 1-1 | $CuCl_2$ (0.005) | di-n-butylamine (0.68) | Air (300) | 25 | 10,200 | 2.2 |
| Example 2-2 | Example 1-2 | $CuCl_2$ (0.005) | di-n-butylamine (0.68) | Air (300) | 25 | 16,200 | 2.5 |
| Example 2-3 | Example 1-3 | $CuCl_2$ (0.01) | di-n-butylamine (0.68) | Air (300) | 40 | 4,500 | 2.9 |
| Example 2-4 | Example 1-11 | $CuCl_2$ (0.005) | di-n-butylamine (0.68) | Air (300) | 25 | 10,200 | 2.2 |
| Example 2-5 | Example 1-12 | $CuCl_2$ (0.005) | di-n-butylamine (0.68) | Air (300) | 25 | 16,200 | 2.5 |

As a result of the experiment, it was confirmed that high-molecular-weight PPO may be prepared by performing the oxidative coupling reaction of the oligomeric PPO prepared by the preparation method of the present disclosure again using the catalyst.

The invention claimed is:

1. A method for preparing polyphenylene oxide, the method comprising:

preparing a mixture comprising 2,6-xylenol and ortho-cresol by an alkylation reaction of phenol with methanol (step 1);

performing an oxidative coupling reaction of the mixture of the step 1 in the presence of a copper-based catalyst and an amine-based additive (step 2); and separating ortho-cresol from the reaction product resulting from the step 2 and obtaining polyphenylene oxide consisting of a repeating unit represented by the following Chemical Formula 1 (step 3), wherein the mixture comprises ortho-cresol at a molar ratio of 0.2 to 0.8 with respect to 1 mole of 2,6-xylenol, and the amine-based additive comprises a secondary amine, a pyridine-based compound, or a mixture thereof, and the polyphenylene oxide is an oligomeric polyphenylene oxide having a molecular weight distribution of 1.7 to 3:

[Chemical Formula 1]

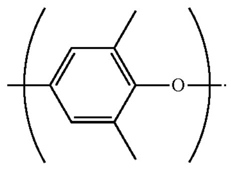

2. The method of claim 1, wherein the steps 1, 2 and 3 are performed as a series of successive reactions.

3. The method of claim 1, wherein the copper-based catalyst is one or more selected from the group consisting of copper(I) oxide, copper(I) halide, copper(I) sulfate, copper (I) nitrate, copper(II) oxide, copper(II) halide, copper(II) sulfate, copper(II) nitrate, and salts thereof.

4. The method of claim 1, wherein the copper-based catalyst is used at a ratio of 0.001 mole to 0.1 mole, based on 1 mole of 2,6-xylenol.

5. The method of claim 1, wherein the secondary amine has two $C_{1-20}$ aliphatic alkyl groups in the molecule.

6. The method of claim 1, wherein the secondary amine is dimethyl amine, diethyl amine, di-n-propyl amine, di-i-propyl amine, di-n-butyl amine, di-i-butyl amine, di-t-butyl amine, dipentyl amine, dihexyl amine, dioctyl amine, didecyl amine, methylethyl amine, methylpropyl amine, or methylbutyl amine.

7. The method of claim 1, wherein the pyridine-based compound is an aminopyridine-based compound, a mono-alkylpyridine-based compound, or a dialkylpyridine-based compound.

8. The method of claim 1, wherein the pyridine-based compound is 2-amino pyridine, 3-amino pyridine, 4-amino pyridine, 4-dimethylaminopyridine, 2,3-diamino pyridine, 2,5-diamino pyridine, 2,6-diamino pyridine, 2-amino-6-methyl pyridine, 3-amino-6-isopropyl pyridine, 4-pyrrolidino pyridine, 2-methyl pyridine, 3-methyl pyridine, 4-methyl pyridine, 2,3-dimethyl pyridine, 2,4-dimethyl pyridine, 2,5-dimethyl pyridine, 2,6-dimethyl pyridine, 3,4-dimethylpyridine, or 3,5-dimethyl pyridine.

9. The method of claim 1, wherein the amine-based additive is used at a ratio of 0.1 mole to 1 mole, based on 1 mole of 2,6-xylenol.

10. The method of claim 1, wherein the copper-based catalyst is one or more selected from the group consisting of copper(I) oxide, copper(I) halide, copper(I) sulfate, copper (I) nitrate, and salts thereof, and the amine-based additive is a pyridine-based compound; or the copper-based catalyst is one or more selected from the group consisting of copper(II) oxide, copper(II) halide, copper(II) sulfate, copper(II) nitrate, and salts thereof, and the amine-based additive is a secondary amine.

11. The method of claim 1, wherein the oxidative coupling reaction is performed by feeding air at a rate of 80 cc/min to 350 cc/min by air bubbling.

12. The method of claim 1, wherein the ortho-cresol is separated by fractional distillation.

13. The method of claim 1, wherein the polyphenylene oxide is an oligomeric polyphenylene oxide having a number average molecular weight of 1,600 g/mol to 3,500 g/mol, and a glass transition temperature of 140° C. to 180° C.

14. The method of claim 1, further comprising the step of performing a secondary oxidative coupling reaction of the polyphenylene oxide obtained in the step 3 in the presence of a copper-based catalyst and an amine-based additive.

15. The method of claim 1, further comprising the step of introducing the separated ortho-cresol into the alkylation reaction of the step 1, after separating the ortho-cresol in the step 3.

* * * * *